United States Patent [19]

Lakey

[11] Patent Number: 5,584,166
[45] Date of Patent: Dec. 17, 1996

[54] FLEXIBLE PACKAGE END SEALING AND CUTTING METHOD AND APPARATUS

[76] Inventor: Lawrence D. Lakey, 4628 O'Connor Ct., Irving, Tex. 75062

[21] Appl. No.: 337,644

[22] Filed: Nov. 10, 1994

[51] Int. Cl.$^6$ ................................. B65B 09/00
[52] U.S. Cl. .................. 53/451; 53/551; 53/374.4; 53/374.5; 53/371.4; 53/371.5
[58] Field of Search ................ 53/550, 551, 568, 53/374.6, 371.6, 371.4, 371.5, 374.4, 374.5, 450, 451

[56] References Cited

U.S. PATENT DOCUMENTS

| | | | |
|---|---|---|---|
| 1,767,824 | 6/1930 | Voigt | 53/259 |
| 2,546,721 | 3/1951 | Campbell | 93/3 |
| 2,803,100 | 8/1957 | Aalseth | 53/371.4 |
| 2,951,325 | 9/1960 | Podlesak et al. | 53/550 |
| 3,217,464 | 11/1965 | Feingold | 53/187 |
| 3,217,857 | 11/1965 | Ellis et al. | 198/33 |
| 3,472,556 | 10/1969 | Bolton | 299/43 |
| 3,504,784 | 4/1970 | Noyes | 198/170 |
| 3,513,629 | 5/1970 | Hogland et al. | 53/182 |
| 3,527,337 | 9/1970 | Formo | 198/170 |
| 3,581,457 | 6/1971 | Gerlach et al. | 53/28 |
| 3,615,002 | 10/1971 | Bolton | 198/170 |
| 3,916,597 | 11/1975 | Martelli | 53/14 |
| 4,035,984 | 7/1977 | Gerlach et al. | 53/28 |
| 4,101,020 | 7/1978 | Langen | 198/478 |
| 4,102,111 | 7/1978 | Nack et al. | 53/371.4 |
| 4,106,262 | 8/1978 | Aterianus | 53/28 |
| 4,141,196 | 2/1979 | Blanding | 53/374.6 |
| 4,183,964 | 1/1980 | Vinokur | 426/412 |
| 4,185,443 | 1/1980 | Budzyn | 53/550 |
| 4,218,863 | 8/1980 | Howard et al. | 53/547 |
| 4,272,944 | 6/1981 | Suga et al. | 53/511 |
| 4,430,844 | 2/1984 | James | 53/450 |
| 4,455,808 | 6/1984 | Netzhammer | 53/373 |
| 4,464,883 | 8/1984 | Glover | 53/550 |
| 4,506,488 | 3/1985 | Matt et al. | 53/55 |
| 4,514,963 | 5/1985 | Bruno | 53/493 |
| 4,525,977 | 7/1985 | Matt | 53/55 |
| 4,553,368 | 11/1985 | Ziller | 53/51 |
| 4,574,566 | 3/1986 | Eaves et al. | 53/450 |
| 4,624,100 | 11/1986 | Lesch | 53/550 |
| 4,751,808 | 6/1988 | Hadden | 53/551 |
| 4,768,411 | 11/1988 | Su | 83/170 |
| 4,938,338 | 7/1990 | Crawford et al. | 198/389 |
| 4,949,846 | 8/1990 | Lakey | 206/484 |
| 4,967,541 | 11/1990 | Lakey | 53/550 |
| 5,070,675 | 12/1991 | Lakey | 53/550 |
| 5,072,575 | 12/1991 | Lakey | 53/550 |
| 5,271,210 | 12/1993 | Tolson | 53/374.6 |
| 5,367,859 | 11/1994 | Suga | 53/374.6 |

OTHER PUBLICATIONS

Packaging Digest, Advertisement for Bemis Machinery Co., Inc., Nov., 1989.

*Primary Examiner*—John Sipos
*Assistant Examiner*—Gene L. Kim
*Attorney, Agent, or Firm*—Jenkens & Gilchrist, P.C.

[57] ABSTRACT

A counter rotating or reciprocating frame is pivotally connected at one end to a main frame and has a pair of sealing and cutting jaws counter-rotatably connected at the other end. A main drive transfers drive motion to a end seal drive on the reciprocating frame which rotates the upper and lower sealing jaws. The main drive transfer also provides drive motion for a linear drive which converts the drive motion into a linear drive motion. A linear drive transfer mechanism transfers the linear drive motion to the reciprocating frame. The motion of a reciprocating frame and the frequency of the upper and lower sealing jaws engaging are synchronized such that a longitudinal tube of flexible wrapping material engaged at specific locations to form end seals and end cuts in the longitudinal tube of flexible wrapping material which create individual flexible packages.

14 Claims, 5 Drawing Sheets

FLEXIBLE PACKAGE END SEALING AND CUTTING METHOD AND APPARATUS

BACKGROUND

The present invention generally relates to an article wrapping device, and, more particularly, to an end sealing apparatus and method for an article wrapping device.

Horizontal wrapping machines of various types are well known in the material handling art and typically comprise a forming box structure through which an elongated sheet of flexible wrapping material is drawn. The forming box is operative to continuously form from the sheet a forwardly moving tube having a rearwardly disposed open inlet end, and a laterally projecting "fin" defined by drawn-together side edge portions of the sheet. An article in-feed system is used to insert articles to be wrapped into the open tube inlet end. The inserted articles, in a longitudinally spaced array, are then carried within the wrapping material to as it forwardly exits the forming box. The individual articles, or associated groups of articles, as may be the case, forwardly transported within the tube are spaced apart by spaced longitudinal sections of the tube.

As the article-containing tube exits the forming box, the fin portion of the tube is drawn between, and heat sealed by, an opposed pair of counter rotating heat sealing jaws. The sealed fin is then passed through a foldover station, which operates to fold the sealed fin over onto an adjacent portion of the tube. The tube, with its sealed and folded over fin, is then passed through a cutting and sealing station which operates to compress, heat seal, and transversely cut the longitudinal tube sections between longitudinally adjacent article pairs, or sets, to form individual, article-containing packages with sealed opposite ends.

In conventional wrapping machines, this final sealing and cutting process is typically performed by passing the tube through a pair of opposed, counter-rotating cutting and sealing bar structures, or jaws, which intermittently mesh at radially outer ends thereof to simultaneously compress, heat seal, and cut each longitudinal cut tube section as it passes through the cutting and sealing station. To effect this process, one of the jaws is provided with a cutting knife interposed between first and second corrugated heat sealing sections, while the other jaw is provided with an anvil portion interposed between first and second corrugated heat sealing sections which are mere mirror images of the corresponding corrugations on the knife-carrying jaw.

As a given longitudinal tube section passes between the rotating jaws, the outer jaw ends cooperate to sequentially mesh their first corrugated sections to form a corrugated heat seal along a lead portion of the tube section, force the cutting knife through the tube section and against the anvil to cut away the heat sealed tube section from the balance of the tube section, and then mesh the second corrugated sections of the jaws to form a corrugated heat seal along the balance of the longitudinal tube section.

The speed of the tube section, and subsequent rate of end sealed individual packages produced by the horizontal wrapping machine is dependent upon the rate at which the counter-rotating jaws can seal and separate the ends of the longitudinal tube. The rate at which the counter-rotating jaws can seal and separate the end seals of the tube section is determined by the thermal properties of the flexible wrapping material, the temperature of the counter-rotating jaws, and the time of contact of the counter-rotating jaws with the area of the longitudinal tube which is to be sealed and separated.

For many packaged articles, the rate of the horizontal wrapping machine is increased by using a flexible wrapping material with thermal properties facilitating a rapid end seal with a minimum temperature and time application. However, it is often necessary to package items in materials which do not facilitate a rapid sealing time or lower temperature application. For example, when forming Modified Atmosphere Packaging (MAP), the items to be packaged are sealed in packages having a special gas, or gases, therein. The materials to form MAP, however, typically have thermal properties which inhibit the same speeds of sealing time and temperature as the thinner materials used for articles which do not require MAP. Therefore, it is not always possible to increase the rate of the horizontal wrapping machine by using a flexible wrapping material which facilitates forming end seals with a minimum time and temperature application.

Another method of increasing the rate at which the end seals can be created in the longitudinal tube, is to increase the temperature of the counter-rotating jaws. However, there is a maximum temperature at which the wrapping material of the longitudinal tube will be adversely affected. Therefore, there is a limitation in the ability to increase temperature of the counter-rotating jaws to increase the rate of the end sealing device in a horizontal wrapping machine.

Because the prior art end sealing devices use counter-rotating jaws which rotate in a fixed location, using materials which have slower bonding thermal properties, such as for MAP, traditionally has decreased the rate at which the counter-rotating jaws can seal and cut the longitudinal tube. To overcome this difficulty, some prior art devices have used a step and repeat mechanism. In a step and repeat mechanism, the sealing and cutting jaws are forced into engagement with the longitudinal tube, and are moved to follow the linear progress of the longitudinal tube. However, the step and repeat mechanisms of the prior art require complex pneumatic or hydraulic devices and tracks for engaging and disengaging the longitudinal tube, and for following the longitudinal tube while the cutting and sealing jaws are engagement therewith.

In view of the foregoing, it can be seen that a need exists for an improved apparatus, and associated methods, for producing end seals on individual flexible packages discharged from horizontal wrapping machines, and the like, at an increased rate. It is accordingly an object of the present invention to provide such an improved apparatus and methods thereof.

SUMMARY OF THE INVENTION

The present invention relates to an apparatus for rotary sealing a web of sealable material moving along a generally linear approximately horizontal path which comprises a pivot arm mounted for pivoting movement about a pivot axis perpendicular to and vertically offset from the path, a pair of sealing jaws mounted on the pivot arm, the sealing jaws each having a sealing station on the periphery thereof, means for rotating the sealing jaws to bring the sealing stations into and out of angular sealing registration with each other at the path and for moving the sealing jaws toward and away from each other along a radius line of the pivot arm to bring the sealing stations into and out of radial registration with each other at the path, and means for pivoting the pivot arm about its pivot axis to move the sealing jaws generally along the path of movement of the web a selected distance in the direction of its movement while the jaws are in registration and to move the sealing jaws the selected distance along the path of movement of the web opposite to the direction of its movement while the jaws are out of registration.

In another aspect, the above described invention further includes a cutting means mounted on the sealing jaws at the sealing stations. The cutting means includes a means for rotating the sealing jaws and means for moving the sealing jaws along a radius line of the pivot arm are constructed and arranged to effect the angular and radial registrations substantially simultaneously and the movements out of the angular and radial registration substantially simultaneously.

BRIEF DESCRIPTION FOR THE DRAWINGS

These and other features will become better understood with regard to the following description, appended claims, and accompanying drawings in which:

DETAILED DESCRIPTION

Figure 1:
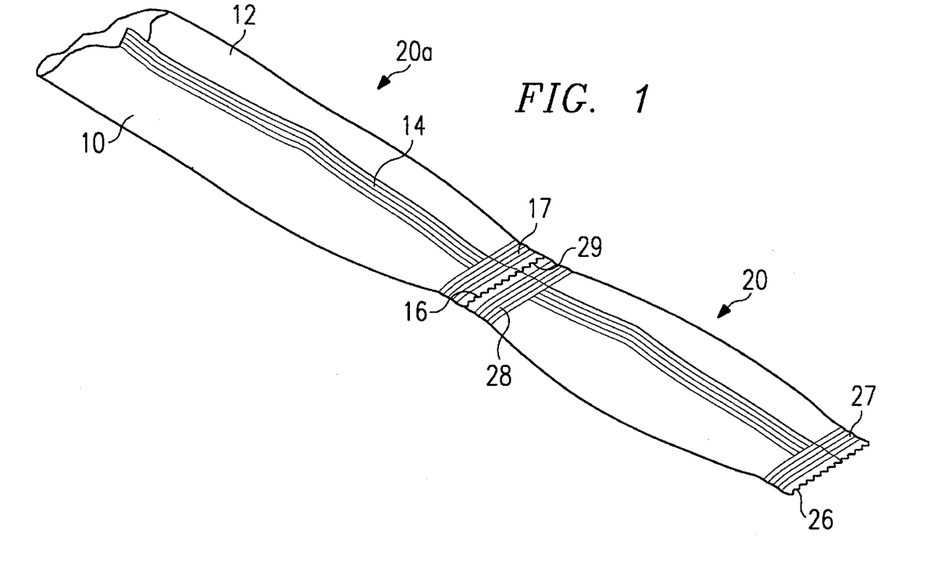
FIG. 1 shows a perspective view of the longitudinal tube of wrapping material and a flexible package formed by two end seals and cuts in the longitudinal tube.

Referring first to FIG. 1, there is shown a perspective view illustrating a longitudinal tube 12 made of flexible wrapping material 10, and a flexible package 20 formed from the longitudinal tube 12. The longitudinal tube 12 has a fin seal 14 which extends longitudinally with the longitudinal tube 12. The fin seal 14 is formed in the longitudinal tube 12 by a heat roller, or the like, applied to either side of the opposed edges of a flexible material 10 which are joined to form the wrapping material into the shape of the longitudinal tube 12.

Still referring to FIG. 1, the package 20 is formed from a section of the longitudinal tube 12 by a first end cut 26, a first end seal 27, a second end seal 28, and a second end cut 29. The second end cut 29 of the flexible package 20 also defines a first end cut 16 in the longitudinal tube 12 for a subsequent flexible package 20a to be formed in the longitudinal tube 12. Also, a first end seal 17 is formed in the longitudinal tube 12 in the same process in which the second end seal 28 was formed in the package 20, for forming the subsequent flexible package 20a from the longitudinal tube 12.

Figure 2:
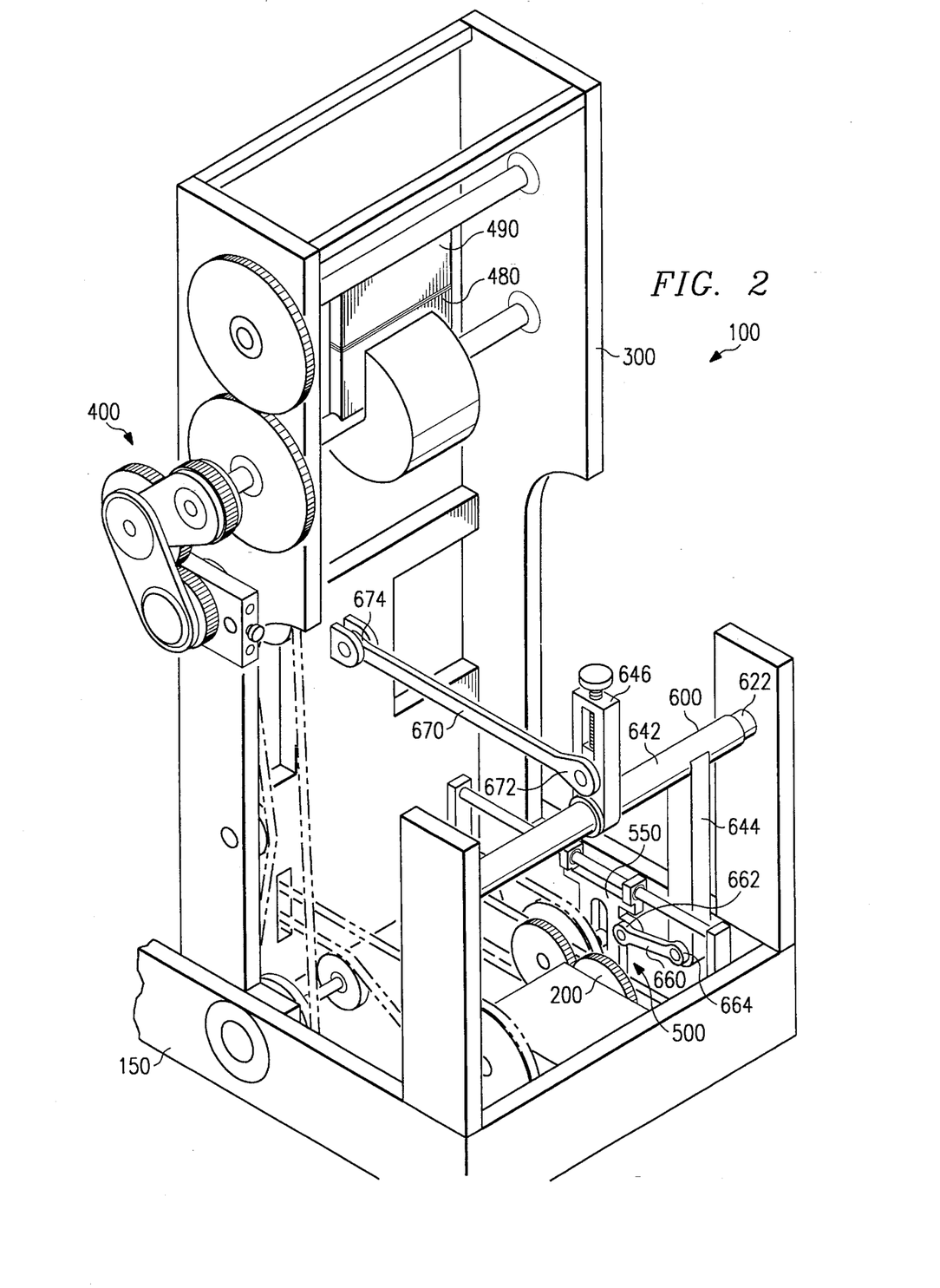
FIG. 2 shows a partial perspective view of an embodiment of the present invention, illustrated as an end seal device for flexible packaging.

Referring now to FIG. 2, there is shown a perspective view of an embodiment of the present invention, illustrated as an end sealing device 100. The end sealing device 100, generally comprises main frame 150, a main drive transfer mechanism 200, a reciprocating frame 300, an end seal drive 400, a linear drive 500, and a linear drive transfer mechanism 600. The main drive transfer mechanism 200 receives drive power from a main drive (not shown) in flexible packaging machine (also not shown) which also forms the longitudinal tube 12 from the flexible wrapping material 10, as shown in FIG. 1. The main drive transfer mechanism 200 transfers the drive motion from the main drive to the end seal drive 400 and the linear drive 500. The end seal drive 400 is mounted on the reciprocating frame 300 and drives the rotation of an upper sealing/cutting jaw 490 and a lower sealing/cutting jaw 480 which create the end seals and end cuts in the flexible packages 20 of FIG. 1. The linear drive transfer mechanism 600 transfers the linear drive motion from the linear drive 500 to the reciprocating frame 300.

Figure 3:
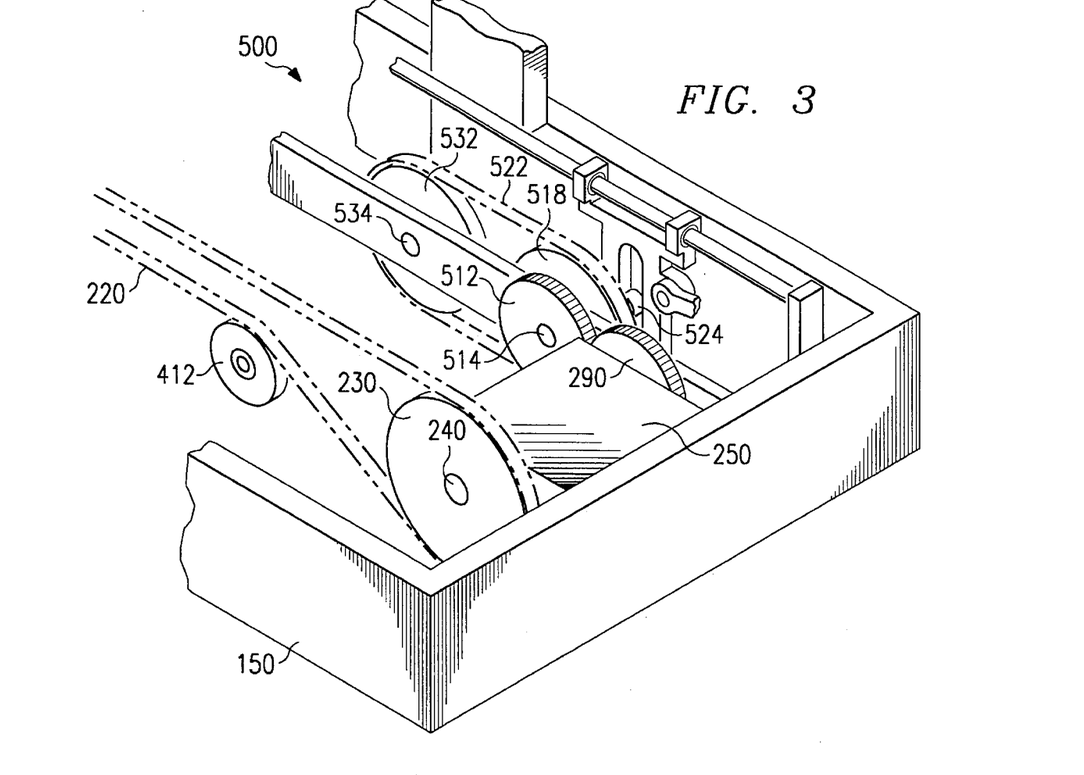
FIG. 3 shows a partial perspective view of the end sealing device in FIG. 2 illustrating the main drive transfer.

Referring now to FIG. 3, there is shown a partial perspective view of the end sealing device 100 from FIG. 2 illustrating the main drive transfer mechanism 200. A main drive chain 220 of the main drive transfer mechanism 200 engages a drive sprocket 412 of the end seal drive 400 and a drive transfer sprocket 230. The main drive chain 220 receives the drive motion from the main drive (not shown) of the flexible packaging machine (also not shown) and transfers that drive motion to the drive sprocket 412 of the end seal drive 400, and the transfer drive sprocket 230. The transfer drive sprocket 230 is fixedly mounted to a transfer drive shaft 240. The transfer drive shaft is rotatably mounted in bearings 250, which are secured to the main frame 150. A linear drive transfer gear 290 is also fixedly attached to the opposite end of the transfer drive shaft 240. The linear drive transfer gear 290 engages a drive gear 512 of movement of the linear drive 500.

Figure 4:
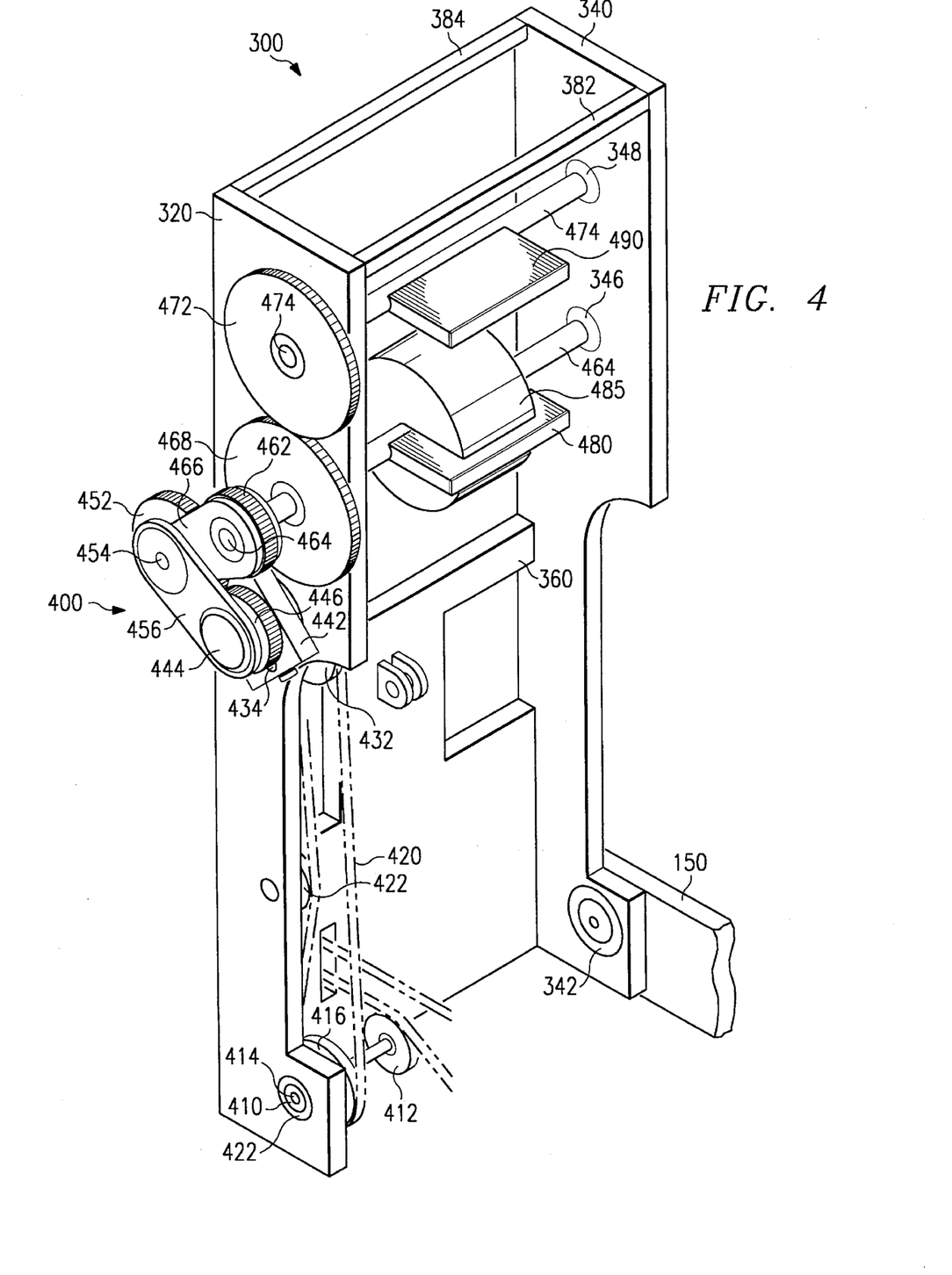
FIG. 4 shows a partial perspective view of the end sealing device in FIG. 2 illustrating the reciprocating frame and end seal drive.

Referring now to FIG. 4, there is shown a partial perspective view of the end sealing device 100 from FIG. 2, illustrating the reciprocating frame 300 and the end seal drive 400. The reciprocating frame 300 generally includes a first arm 320 connected to a second arm 340 by a lower cross brace 360, a first upper cross brace 382, and a second upper cross brace 384. The first arm 320 and the second arm 340 are mounted on the main frame 150 of the end sealing device 100 by a pivot bearing 322 and a pivot bearing 342, respectively. The pivot bearings 322 and 342 share the same axis, which is perpendicular to the direction of the longitudinal tube (not shown) to be sealed.

Still referring to FIG. 4, the end seal drive 400 is mounted on the first arm 320 of the reciprocating frame 300. The drive sprocket 412 is fixedly attached to a drive shaft 414. The drive shaft 414 is rotatably held by a drive bearing 418 in a position which has the same axis of rotation as the pivot bearing 322 of the first arm 320. A drive transfer sprocket 416 is also fixedly attached to the drive shaft 414. Therefore, as the main drive chain 220 causes the drive sprocket 412 to rotate, the drive transfer sprocket 416 is also forced to rotate.

Still referring to FIG. 4, an eccentric drive sprocket 432 is fixedly attached to an eccentric drive shaft 434. The eccentric drive shaft 434 is rotatably mounted to the first arm 320 by an eccentric drive shaft bearing (not shown) which is secured to the first arm 320. A drive chain 420 connects the drive transfer sprocket 416 with the eccentric drive sprocket 432. A tension sprocket 422 is rotatably mounted on the first arm 320 and engages the drive chain 420 to prevent slack in the drive chain 420. In this manner, as the main drive chain 220 rotates the drive sprocket 412, the drive transfer sprocket 416 rotates the eccentric drive sprocket 432 via the drive chain 420. Also, because the drive transfer sprocket 416 rotates about the same axis as the pivot bearing 322 of the first arm 320, the drive chain 420 will transfer drive motion from the drive transfer sprocket 416 to the eccentric drive sprocket 432 without slack occurring in the drive chain 420 due to rotational motion of the first arm 320.

Referring still to FIG. 4, the eccentric drive shaft 434 is rotatably mounted to the first arm 320 by an eccentric drive shaft bearing (not shown). On the opposite side of the arm 320 from the eccentric drive sprocket 432 the eccentric drive shaft 434 has a seal synchronization adjust mechanism 436 (shown in FIG. 7). The seal synchronization adjust mechanism allows the end of the eccentric drive shaft 434 on which the eccentric drive sprocket 432 is attached, to be locked at a different angular position, relative to the axis of the eccentric drive shaft 434, than the adjustable eccentric 442. In this manner, the engagement of the lower sealing/ cutting jaw 480 and the upper sealing/cutting jaw 490 can be synchronized with the movement of the reciprocating frame 300, as will be explained below.

Figure 7:
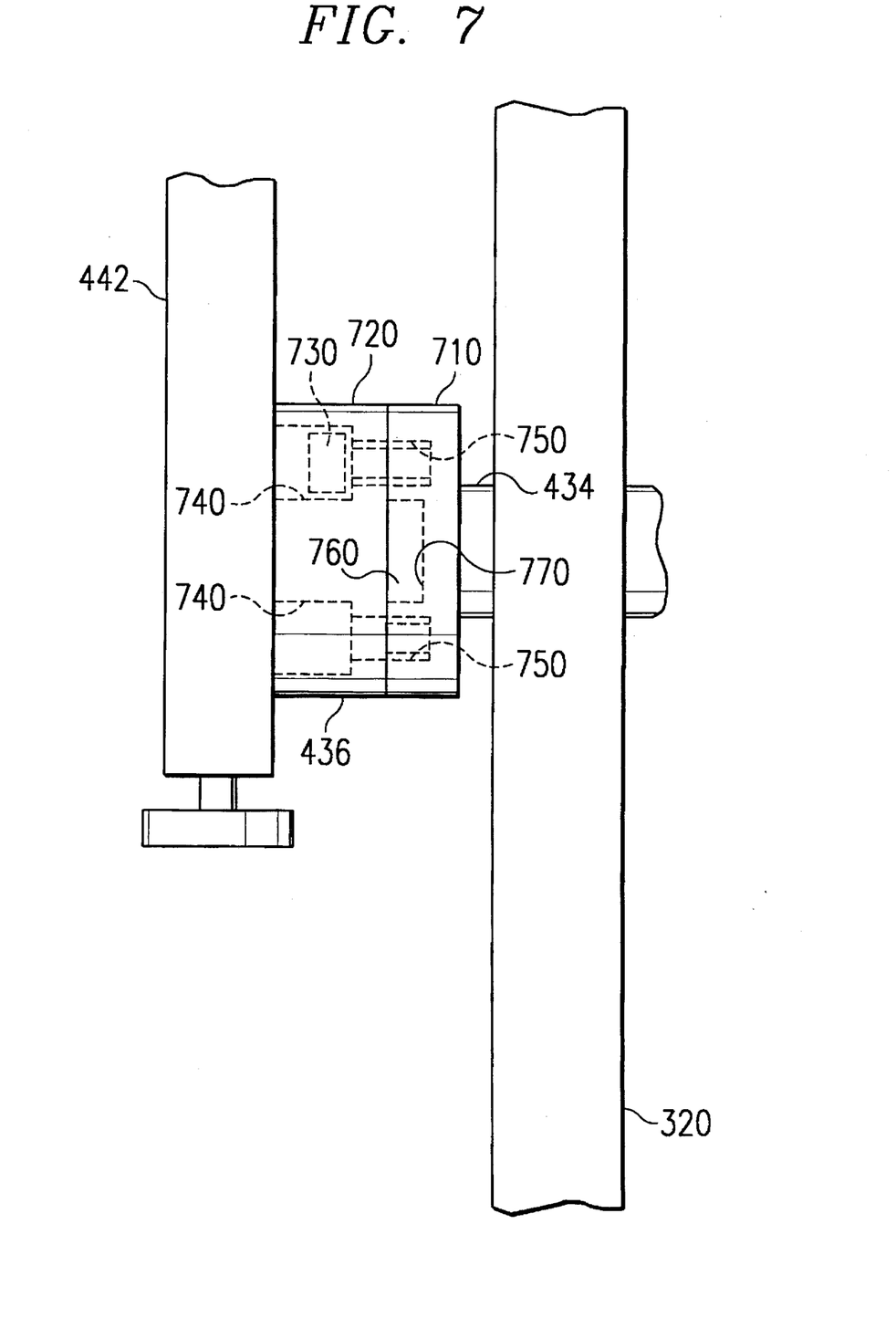
FIG. 7 shows a partial view of the end sealing device from FIG. 2 illustrating the synchronization adjust mechanism.

Referring now to FIG. 7, there is shown a partial view of the end sealing device 100 from FIG. 2, illustrating the seal synchronization adjust mechanism 436. The seal synchronization adjust mechanism 436 includes a first member 710 fixedly attached to the eccentric drive shaft 434, and a second member 720 fixedly attached to the adjustable eccentric 442. A bolt 730 (shown in phantom) passes through one of a plurality of apertures 740 in the second member 720 and engages one of a plurality of threaded apertures 750 (shown in phantom) in the first member 710. The threaded apertures 750 in the first member 710 and the apertures 740 in the second member 720 are located at the same radial distance from the axis of the eccentric drive shaft 434. However, the apertures 750 in the first member 710, and the apertures 740 of the second member 720, are spaced apart such that at least one of the threaded apertures 750 of the first member 710 aligns with at least one of the apertures 740 of the second member 720 at minimal increments of rotation of the second member 740 about the first member 710. Also, a dowel 760 in the second member 720 extends into a dowel aperture 770 in the first member 710.

Referring back now to FIG. 4, an adjustable eccentric 442 is fixedly mounted to the seal synchronization adjust mechanism 436 (shown in FIG. 7) of the eccentric drive shaft 434. An eccentric gear shaft 444 is fixedly mounted at a radial end of the adjustable eccentric 442 with the axis of the eccentric gear shaft 444 being parallel to the axis of the eccentric drive shaft 434. An eccentric gear 446 is fixedly mounted on the eccentric gear shaft 444. In this manner, the axis of the eccentric gear 446 is located at a radial distance from the axis of the eccentric drive shaft 434 which is determined by the setting of the adjustable eccentric 442.

Referring still to FIG. 4, the eccentric gear 446 engages a transfer gear 452 which is rotatably mounted on a transfer shaft 454. A transfer connecting member 456 is rotatably connected at one end with the transfer shaft 454 and rotatably connected at the other end with the eccentric gear shaft 444. The transfer gear 452 engages a seal drive gear 462, which is fixedly attached to the lower seal drive shaft 464. The lower seal drive shaft 464 is rotatably mounted to the first arm 320 by a lower seal bearing (not shown), and rotatably mounted to the second arm 340 by a lower seal bearing 346. A seal drive connecting member 466 is rotatably connected at one end with the lower seal drive shaft 464, and rotatably connected at the other end with the transfer shaft 454.

Still referring to FIG. 4, a lower seal gear 468 is fixedly attached to the lower seal drive shaft 464 and engages an upper seal gear 472. The upper seal gear 472 is identical to the lower seal gear 468 and is fixedly attached to an upper seal shaft 474. The upper seal shaft 474 is rotatably mounted to the first arm 320 by an upper seal bearing (not shown), and is rotatably attached to the second arm 340 by an upper seal bearing 348. In this manner, the lower seal drive shaft 464 and the lower seal drive shaft 474 rotate in opposite directions but with the same rotational speed. In one embodiment, the bearings mounting the upper seal drive shaft 464 are spring mounted for forcing the upper seal drive shaft 474 towards the lower seal drive shaft 464.

Referring still to FIG. 4, a lower sealing/cutting jaw 480 is fixedly attached to the lower seal drive shaft 464 in between the first arm 320 and the second arm 340. An upper sealing/cutting jaw 490 is fixedly attached to the upper seal shaft 474 in between the first arm 320 and the second arm 340. The lower sealing/cutting jaw 480 and the upper sealing/cutting jaw 490 are mounted on the lower seal drive shaft 464 and the upper seal shaft 474, respectively, such that the lower sealing/cutting jaw 480 and the upper sealing/ cutting jaw 490 engage each other once every revolution of the seal drive gear 462. A drum 485 is mounted to the lower or seal shaft 464 which prevents the flexible packages from bending over the lower sealing jaw 480 during engagement of the upper and lower cutting/sealing jaws 490, 480.

Referring back now to FIG. 3, the linear drive 500 has a drive gear 512 which engages the linear drive transfer gear 290 of the main drive transfer mechanism 200. The drive gear 512 is fixedly attached to a drive shaft 514, which is rotatably mounted to the main frame 150 by a drive bearing (not shown). A drive sprocket 518 is also fixedly attached to the end of the drive shaft 514 opposite from the drive gear 512. A drive chain 522 engages the drive sprocket 518 and a idler sprocket 532. The idler sprocket 532 is fixedly attached to an idler shaft 534 which is rotatably mounted to the main frame 150 by an idler bearing 536. A cam 524 is fixedly mounted to one of the links in the drive chain 522 and projects perpendicular to the plane of motion for the chain 522. It can be seen that if the linear drive transfer gear 290 and the drive gear 512 are rotated at a constant speed, the cam 524 will have a constant linear velocity motion from the top of the drive sprocket 518 to the top of the idler sprocket 532, and from the bottom of the idler sprocket 532 to the bottom of the drive sprocket 518.

Figure 5:
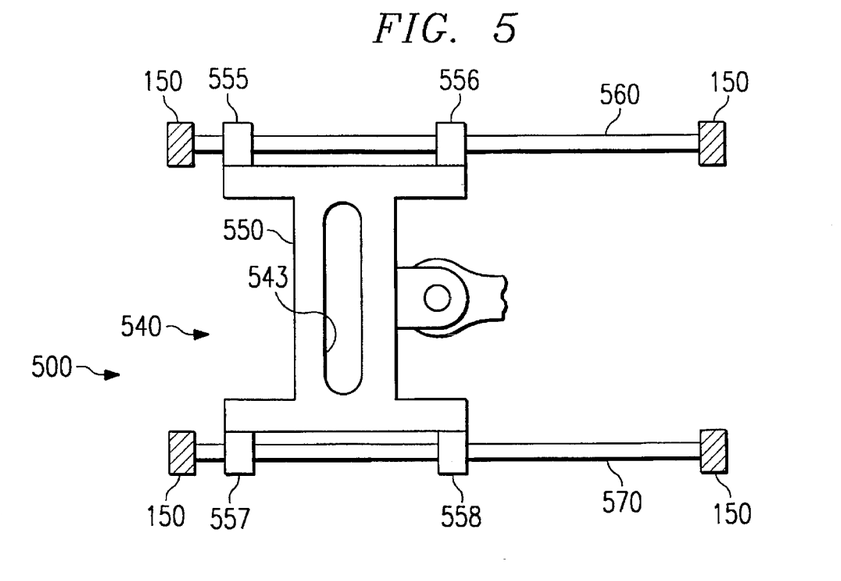
FIG. 5 shows a partial view of the end sealing device in FIG. 2 illustrating the linear drive and linear drive transfer.

Referring now to FIG. 5, the linear drive 500 also includes a shuttle 540 which generally comprises a shuttle body 550, an upper guide bar 560, and a lower guide bar 570. The upper guide bar 560 and the lower guide bar 570 are secured to the main frame 150. The shuttle body 550 has a first upper guide 555 and a second upper guide 556 which are slidably mounted on the upper guide bar 560. The shuttle body 550 also has a first lower guide 557 and a second lower guide 558 which are slidably mounted on the lower guide bar 570. Also, the shuttle body 542 contains a vertical slot or cam follower 543 which is adapted to receive the cam 524.

Referring now to FIGS. 2, 3, and 5 in combination, the upper guide bar 560 and lower guide bar 570 are attached to the main frame 150 such that the cam 524 is disposed within the cam follower 543 of the shuttle body 550. In this manner, the shuttle body 550 will reciprocate in a horizontally linear direction on the upper and lower guide bars 560, 570, corresponding with the motion of the cam 524 as it progress around the drive sprocket 518 and the idler sprocket 532.

Referring back now to FIG. 2, the linear drive transfer mechanism 600 has a shaft 622 fixedly attached to the main frame 150 perpendicularly to the motion of the shuttle body 550. A sleeve 642 is rotatably mounted on the shaft 622. Fixedly mounted to the sleeve 642 is a lower arm 644 extending below the sleeve 642, and an adjustable upright 646 extending upward from the sleeve 642. A lower strut 660 is rotatably attached at a first end 662 to the shuttle body 550, and at a second end 646 to the lower arm 644. An upper strut 670 is pivotally connected at a first end 672 to the adjustable upright 646, and at a second end 674 to the lower cross brace 360 of the reciprocating frame 300. In this manner, the linear motion of the shuttle body 550 is transferred to the reciprocating frame 300, causing the reciprocating frame 300 to rotate back and forth in a reciprocating fashion.

Figure 6:
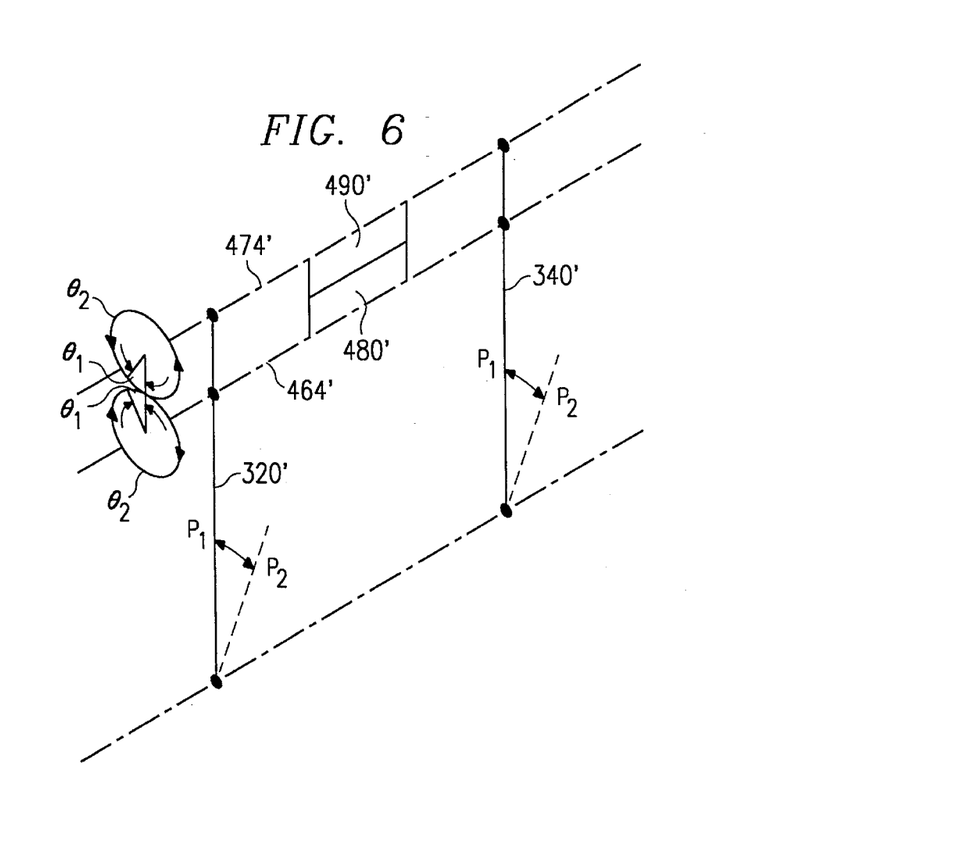
FIG. 6 shows a diagram illustrating the movement as a reciprocating frame and the end seal drive.

Referring now to FIG. 6, there is shown a diagram illustrating the movement of the reciprocating frame 300 and end seal drive 400 of FIG. 4. In FIG. 6, members 320' and 340' represent the first and second arms 320 and 340, respectively, of the reciprocating frame 300 in FIG. 4. Members 464' and 474' represent the lower and upper seal drive shafts 464 and 474 of the end seal drive 400 of FIG. 4. Also, members 480' and 490' represent the lower and upper cutting/sealing jaws 480 and 490 of the end seal drive device 400 in FIG. 4.

Still referring to FIG. 6, it can be seen that the members 464' and 474' counter rotate to engage and disengage the members 480' and 490'. During an engagement or first rotational angle $\theta_1$ of the members 464' and 474', the members 480' and 490' contact each other. During a disengagement or second rotational angle $\theta_2$ of the members 464' and 474', the members 480' and 490' are not in contact and rotating in a counter direction to the first rotational angle $\theta_1$. The beginning of the first rotational angle $\theta_1$ occurs when the members 320 and 340 are in a position $P_1$. The completion of the first rotational angle $\theta_1$ for members 464' and 474' occurs when the members 320' and 340' are in a second position $P_2$.

Referring now to FIGS. 4 and 6 in combination, a constant rotational speed of the eccentric drive sprocket 432 and eccentric drive shaft 434, will cause the seal drive gear 462 and lower seal drive shaft 464 to rotate very slowly through the first rotational angle $\theta_1$ and very quickly through the second rotational angle $\theta_2$. Also, the relative size of the first rotational angle $\theta_1$ to the second rotational angle $\theta_2$, and the relative speeds of the seal drive gear 462 as it rotates through the first rotational angle $\theta_1$ and the second rotational angle $\theta_2$ can be modified by changing the distance between the axis of the eccentric drive shaft 434 and the axis of the eccentric gear shaft 444 with the adjustable eccentric 442. The greater the distance between the axis of the eccentric drive shaft 434 and the axis of the eccentric gear shaft 444, the greater the difference between the size of the rotational angles $\theta_1$ and $\theta_2$ and the rotational speed of the seal drive gear 462 as it passes through those angles. Also, the smaller the distance between the axis of the eccentric drive shaft 434 and the eccentric gear shaft 444, the smaller the difference between the rotational angles $\theta_1$ and $\theta_2$.

Still referring to FIGS. 4 and 6 in combination, the sprockets and gears of the end seal drive 400 are selected such that the first rotational angle $\theta_1$ of the seal drive gear 462 occurs during the rotational angle of the lower and upper seal drive shafts 464, 474 in which the lower and upper sealing/cutting jaws 480, 490 engage, and such that the rotational speed of the lower and upper seal drive shafts 464, 474 is at a minimum speed. In this manner, the dwell time, or the time of contact between the upper and lower cutting/sealing jaws 490, 480 is maximized during the first rotational angle $\theta_1$ of the seal drive gear 462.

Referring now to FIGS. 1–7 in combination, it can be seen how the end sealing machine 100 of the present invention operates to form the end seals in the longitudinal tube 12 of flexible wrapping material 10, to create the flexible packages 20. The longitudinal tube 12 with the articles to be packaged therein, progresses linearly between the upper seal shaft 474 and the lower seal drive shaft 464. A main drive (not shown) in the flexible packaging machine (not shown) provides the drive motion to the main drive chain 220. The main drive chain 220 transfers the drive motion to a drive sprocket 412 of the end seal drive 400, and a transfer drive sprocket 230. The rotation of the transfer drive sprocket 230 causes the linear drive transfer gear 290 to rotate the drive gear 512 of the linear drive 500.

Referring to FIGS. 1–7, in combination, as described above, rotation of the drive sprocket 512 and the linear drive 500 causes the shuttle body 550 to reciprocate linearly on the upper and lower guide bars 560. Also as shown above, the linear drive transfer utilizes the linear motion of the shuttle body 550 to rotate the reciprocating frame 300 between the first position $P_1$ where the longitudinal tube 12 enters the area of the end sealing device 100, to the second position $P_2$ towards the rear of the end sealing device 100, where the flexible packages 20 formed from the longitudinal tube 12, are discarded. The distance between the first and second position $P_1$, $P_2$ of the reciprocating frame 300 is controlled by the adjustable upright 646 of the linear drive transfer mechanism 600. The adjustable upright 646 allows a user to adjust the distance between the sleeve 642 and the first end 672 of the upper strut 670. As the adjustable upright 646 is increased in length, the distance between the first and second position of the reciprocating frame 300 increases. As the length of the adjustable upright 646 is decreased, the distance between the first and second position $P_1$, $P_2$ of the reciprocating frame 300 is decreased. In this manner, the distance between the first end seal and the second end seal of the flexible package is controlled by the adjustable upright 646.

Referring still to FIGS. 1–7, in combination, the engagement and disengagement of the upper and lower sealing/cutting jaws 490, 480 are synchronized to coincide with the first position and second position, respectively, of the reciprocating frame 300. To synchronize the upper and lower cutting/sealing jaws 490, 480, the reciprocating frame 300 is located at a mid position between the first and second positions $P_1$, $P_2$ of the reciprocating frame 300. The seal synchronization adjust mechanism 436 of the end seal drive 400 is locked in an angular position which locates the upper and lower cutting/sealing jaws 490, 480 in mid-point of the engagement angle $\theta_1$, at the midposition of the reciprocating frame 300. Once the seal synchronization adjust mechanism 436 has been locked into position, the length of the adjustable eccentric 442 is adjusted to cause the upper and lower sealing/cutting jaws 490, 480 to begin the engagement angle $\theta_1$ at the first position $P_1$ of the reciprocating frame 300, and to end the engagement angle $\theta_1$ at the second position $P_2$ of the reciprocating frame 300.

Still referring to FIGS. 1–7, in combination, the longitudinal tube 12 progressing to the end sealing device 100 is engaged between the upper and lower cutting/sealing jaws 490, 480 at the first position $P_1$ of the reciprocating frame 300. As longitudinal tube continues to progress through the end sealing device 100, the reciprocating frame 300 moves in the same direction as the longitudinal tube 12, and the upper and lower cutting/sealing jaws 490, 480 progress through the engagement angle $\theta_1$ with the longitudinal tube 12, thereby forming two end seals with an end cut therebetween. As the reciprocating frame 300 reaches the second position, the upper and lower cutting/sealing jaws 490, 480 disengage from the longitudinal tube 12, and the newly formed flexible package 20. After the upper and lower cutting/sealing jaws 490, 480 disengage from the longitudinal tube 12, the reciprocating frame 400 progresses from the second position to the first position, and the upper and lower cutting/sealing jaws 490, 480 rotate around the disengagement angle $\theta_2$ to begin engagement once again with the longitudinal tube 12. In this manner, the end sealing device increases the time in which the upper and lower cutting/sealing jaws 490, 480 engage the longitudinal tube 12, and form the end seals and end cuts therein for forming the flexible packages 20.

It is thus believed that the operation and construction of the present invention will be apparent from the foregoing description of a preferred embodiment. While the device and methods shown are described as being preferred, it will be obvious to a person of ordinary skill in the art that various changes and modifications may be made therein without departing from the spirit and scope of the invention as defined in the following claims. Therefore, the spirit and scope of the appended claims should not be limited to the description of the preferred embodiments contained herein.

What is claimed is:

1. Apparatus for rotary sealing a web of sealable material moving along a generally linear approximately horizontal path comprising:

a pivot arm mounted for pivoting movement about a pivot axis perpendicular to and vertically offset from said path;

a pair of sealing jaws mounted on said pivot arm;

means for rotating said sealing jaws to bring said sealing jaws into and out of angular sealing registration with each other at along a radius line of said pivot arm such that said sealing jaws come into and out of radial registration with each other at said path; and means for pivoting said pivot arm about its pivot axis to move said sealing jaws generally along the path of movement of said web a selected distance in the direction of its movement while said jaws are in registration and to move said sealing jaws generally along the path of movement of said web said selected distance in a direction opposite to the direction of its movement while said jaws are out of registration.

2. Apparatus in accordance with claim 1 and further comprising cutting means mounted on said sealing jaws at said sealing stations.

3. Apparatus in accordance with claim 1 in which said means for pivoting said pivot arm about its pivot axis comprises a rotary gear to which power may be supplied from a source external to said apparatus;

a driven gear mounted coaxially with said rotary gear for drive thereby, an idler gear aligned with said driven gear and offset therefrom;

an endless loop of chain trained around said driven gear and said idler gear;

a follower mounted on said loop of chain for looping movement with said chain;

a shuttle with a cam slot therein mounted to engage said follower and move in a substantially linear back and forth path in response to looping movement of said follower; and connecting means for transferring back and forth movement of said shuttle to said pivot arm.

4. Apparatus for rotary sealing of a web of sealable material moving along a generally linear approximately horizontal path comprising:

a pivot arm pivotable about a pivot axis parallel to and vertically offset from said path;

a pair of rotary sealing jaws mounted on said pivot arm;

means for pivoting said arm in the direction of movement of said web and for pivoting said arm in a direction opposite to the direction of movement of said web; and means for rotating said sealing jaws at a first selectively controllable angular velocity and concurrently maintaining said sealing jaws in sealing engagement with said web while said pivot arm is moving in the direction of movement of said web and for rotating said sealing jaws at a second angular velocity to a position out of engagement with said web while said pivot arm is moving in a direction opposite to the direction of movement of said web.

5. The apparatus according to claim 4, wherein said first angular velocity is less than said second angular velocity.

6. The apparatus according to claim 4, wherein said means for pivoting said pivot arm comprises:

a drive sprocket which receives rotary power from a rotary power source;

an idler sprocket aligned with said drive gear;

an endless loop of chain trained around said drive sprocket and said idler sprocket;

a follower mounted on said endless loop of chain for looping movement with said endless loop chain;

a shuttle with a cam slot therein, said shuttle slidably mounted to engage said follower within said cam slot and to move back and forth in a substantially linear back and forth path in response to the looping movement of said follower; and connecting means for transferring the back and forth movement of said shuttle to said pivot arm.

7. The apparatus according to claim 6, wherein said connecting means comprises:

a transfer pivot arm having a transfer pivot axis;

a shuttle strut having a first end pivotally connected to said shuttle and a second end pivotally connected to said transfer pivot arm; and a pivot strut having a first end pivotally connected to said transfer pivot arm and a second end pivotally connected to said pivot arm.

8. The apparatus according to claim 7, wherein the first end of said pivot strut is pivotally connected to said transfer pivot arm at a selectable distance from the transfer pivot arm axis.

9. The apparatus according to claim 1, wherein the second end of said shuttle strut is pivotally connected to said transfer pivot arm at a selectable distance from the transfer pivot arm axis.

10. The apparatus according to claim 4, including means for changing the timing of the sealing engagement of said sealing jaws relative to the pivot of said pivot arm.

11. The apparatus according to claim 4 including means for changing the timing of the first angular velocity of said sealing jaws relative to the movement of said pivot arm.

12. A method for sealing a web of sealable material, comprising the steps of;

moving the web of sealable material along an generally linear aproximately horizontal path;

rotating a pair of sealing jaws into sealing engagement with the web of sealable material and pivoting the pair of sealing jaws on a pivot arm from a first position to a second position such that the sealing jaws travel substantially along the path of said web of sealable material; and rotating the pair of sealing jaws out of engagement and pivoting the pivot arm to the first position.

13. The method according to claim 12, wherein said step of rotating said sealing jaws into engagement includes rotating said sealing jaws at a first angular velocity while said sealing jaws are in sealing engagement, and said step of rotating said sealing jaws out of engagement includes rotating said sealing jaws at a second angular velocity while said sealing jaws are out of sealing engagement.

14. The method according to claim 13, wherein said first angular velocity is smaller than said second angular velocity.

\* \* \* \* \*